United States Patent [19]

Hattori et al.

[11] Patent Number: 4,538,254
[45] Date of Patent: Aug. 27, 1985

[54] PICKUP DEVICE

[75] Inventors: Osamu Hattori, Chigasaki; Shingo Tamura, Yokohama, both of Japan

[73] Assignee: Hitachi, Ltd., Tokyo, Japan

[21] Appl. No.: 418,253

[22] Filed: Sep. 15, 1982

[30] Foreign Application Priority Data

Sep. 18, 1981 [JP] Japan .................................. 56-146211

[51] Int. Cl.$^3$ ............................................ G11B 17/00
[52] U.S. Cl. ...................................... 369/43; 369/126; 369/215; 369/244
[58] Field of Search .................... 358/338; 369/43, 126, 369/170, 215, 220, 244

[56] References Cited

U.S. PATENT DOCUMENTS 3,873,764  3/1975  Boltz .................................... 358/338
4,366,563 12/1982  Riddle .................................. 369/43

FOREIGN PATENT DOCUMENTS 122243  9/1980  Japan ..................................... 369/43

*Primary Examiner*—Alan Faber
*Attorney, Agent, or Firm*—Antonelli, Terry & Wands

[57] ABSTRACT

A pickup device for compensating for jitter by driving a scanning needle in the direction of a record track on a disc comprises a resiliently held support which supports a cantilever having the scanning needle mounted thereon and a permanent magnet mounted at an end thereof, and a driver to which a drive current is supplied to generate a magnetic field to be acted on the permanent magnet. A drive force created by the action of the magnetic field is in parallel to a surface of the disc so that the scanning needle is driven in parallel to the surface of the disc.

5 Claims, 4 Drawing Figures

PICKUP DEVICE

BACKGROUND OF THE INVENTION

1. Field of the Invention

The present invention relates to a pickup device suitable for a video disc player of a type in which a scanning needle scans a record track while it is in contact with a disc.

2. Description of the Prior Art

It is well known that a video disc system has two major types, one being a contact type video disc such as a piezoelectic system or an electrostatic capacitance system in which a scanning needle scans a record track while it is in contact with a disc, and the other being a non-contact type video disc such as an optical system in which the scanning needle scans the record track while it is not in contact with the disc. Each of those types has advantages and disadvantages. Among others, the contact type video disc has a big disadvantage that the disc and the scanning needles are damaged or worn because the scanning needle contacts the disc.

Another big disadvantage of the contact type video disc is that tracking is unstable as the contact condition of the disc and the scanning needle changes. In this type of video disc, it has been proposed to form a guide groove to guide the scanning groove and form a record track in the guide groove to permit tracking of the scanning needle, or, in the electrostatic capacitance system, to form no guide groove but use a pilot signal to permit tracking of the scanning needle. In these systems, the tracking is stable when the scanning needle contacts the disc with an appropriate needle pressure. However, when the contact condition of the scanning needle and the disc changes by surface vibration of the disc resulting in the decrease of the needle pressure, the scanning needle is ready to move away from the disc and the tracking is unstable.

In a prior art pickup device in which the needle pressure is applied by a resilient member which supports a cantilever on which the scanning needle is mounted, a displacement characteristic of the resilient member is appropriately selected such that the decrease of the needle pressure is small even when the surface vibration of the disc is included so that the scanning needle can track the surface vibration.

The disc includes a wow, a flutter and an excentricity which cause jitter in a reproduce video signal. Accordingly, the prior art pickup device has jitter compensation means for mechanically vibrating the scanning needle in a direction of the record track in accordance with the detected jitter. However, when the scanning needle is vibrated in this manner, a displacement of the scanning needle by the vibration causes a change of the contact condition of the scanning needle and the disc. This is discussed in further detail.

FIG. 1 shows a side view of a prior art pickup device and

FIG. 2 shows a side view illustrating a displacement of a scanning needle when it is compensated for jitter.

Numeral 1 denotes a cantilever, numeral 2 denotes a tip holder, numeral 3 denotes a scanning needle, numeral 4 denotes a fly reed, numeral 5 denotes a coupling rubber, numeral 6 denotes a permanent magnet, numeral 7 denotes a support, numeral 8 denotes a support rubber, numeral 9 denotes a jitter compensation driver, numeral 10 denotes a drive coil, numeral 11 denotes a disc and numeral 12 denotes a disc surface.

The operation of the prior art device is explained below.

Referring to FIG. 1, the tip holder 2 having the scanning needle 3 fixed thereto is mounted at one end of the cantilever 1, which in turn is supported by the support 7 through the coupling rubber 5. The support 7 is supported by the support rubber 8 and the permanent magnet 6 is fixed to one end thereof. The drive coil 10 of the jitter compensation driver 9 is arranged around the permanent magnet 6. When a player is in a rest position, the cantilever 1 is lifted by a cantilever lifter, not shown so that the scanning needle 3 is off the disc surface 12. In a play position, the cantilever 1 is descended so that the scanning needle 3 is in contact with the disc surface 12 as shown. The resilient fly reed 4 applies an appropriate needle pressure to the scanning needle 3 to bring the scanning needle 3 into contact with the disc surface 12. The fly reed 4 is made of conductive material and connected to an electrode (not shown) of the scanning needle 3. The fly reed 4 serves as a transmission line to supply a signal picked up at the electrode to a reproducing signal processing circuit, not shown. When a signal representing the amount of jitter detected by the reproducing signal processing circuit is supplied to the driver 9, a jitter compensation drive current flows through the drive coil 10 which generates a magnetic field which in turn acts an the permanent magnet 6 to create a drive force to displace the cantilever 1 in the direction of an arrow A or B. As a result, the scanning needle 3 is restricted to the disc surface 12 and displaced in the direction of an arrow C or D, that is, in the direction of the record track. In this manner, the jitter is eliminated.

Since the pickup device is constructed as described above, the cantilever 1 is inclined to the disc surface 12 by an angle $\theta$ when the cantilever 1 descends to the play position. Thus, as the cantilever 1 is displaced in the direction of the arrow A or B, a force parallel to the cantilever 1 is applied to the scanning needle 3 so that the scanning needle 3 is displaced by the disc surface 12 in the direction parallel thereto (the direction of the arrow C or D), and a force normal to the disc surface 12 also acts to the scanning needle 3. Accordingly, when the cantilever 1 is displaced in the direction of the arrow A, an urging force toward the disc surface 12 is applied to the scanning needle 3 so that the needle pressure is increased. As a result, the disc 11 or the scanning needle 3 may be damaged. On the other hand, when the cantilever 1 is displaced in the direction of the arrow B, a separation force away from the disc surface 12 acts to on the scanning needle 3 so that the needle pressure decreases and the tracking is unstable.

The direction of the drive force created by the mutual action of the magnetic field by the drive coil 10 and the permanent magnet 6 is in the longitudinal direction of the cantilever 1. As shwon in FIG. 2, if a line connecting a support point P of the support 7 and a center Q of the permanent magnet 6 does not coincide with the drive force F, a torque is created in the support 7 around the support point P so that the support 7 is rotated. As a result, the cantilever 1 is rotated in the direction of an arrow K. If the rotational direction is normal to the disc surface 12, a force to change the needle pressure is applied to the scanning needle 3. As a result, the scanning needle 3 or the disc 11 may be damaged and the tracking is unstable. Since it is very difficult to construct the device such that the line connecting the support point P and the center Q of the permanent magnet 6 exactly coincides with the drive force F, the above problem cannot be resolved in the prior art device.

As described above, the prior art pickup device cannot avoid the damage of the disc and the scanning needle and the increase of the wear due to the action of the jitter compensation means and results in instability of the tracking.

SUMMARY OF THE INVENTION

It is an object of the present invention to provide a pickup device in which a contact condition of a scanning needle and a disc does not change when jitter compensation means operates.

In order to achieve the above object, in accordance with the present invention, the pickup device is constructed such that a drive force created by a mutual action of a permanent magnet mounted on a support and a magnetic field generated by a drive coil is in parallel to a disc surface in a play position and a line connecting a support point of the support and a center of the permanent magnet coincides with the direction of the drive force.

DESCRIPTION OF THE PREFERRED EMBODIMENTS

One embodiment of the pickup device of the present invention is now explained with reference to the accompanying drawings.

Figure 1:
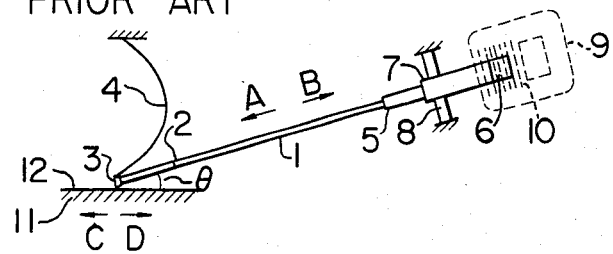
FIG. 1 shows a side view of a prior art pickup device.
Figure 2:
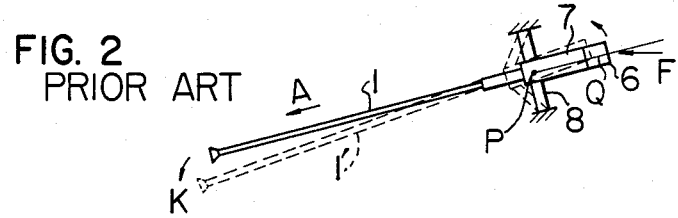
FIG. 2 shows a side view for explaining the operation of the pickup device of FIG. 1.
Figure 3:
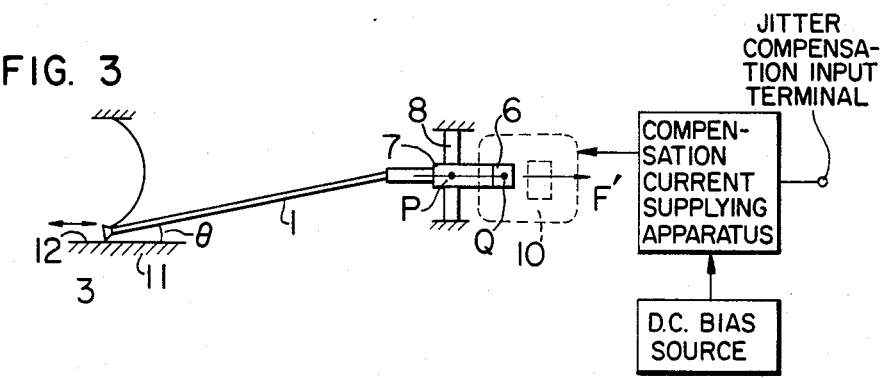
FIG. 3 shows a side view of one embodiment of a pickup device of the present invention.

FIG. 3 shows a side view of one embodiment of the present invention, in which the like elements to those shown in FIG. 1 are designated by the like numerals.

The cantilever 1 is lifted up and down by a lifter, not shown. FIG. 3 shows a position when the lifter is not in operation. Accordingly, the scanning needle 3 is in contact with the disc 11. The cantilever 1 is inclined to the disc surface 12 by an angle $\theta$. Under this condition, the support 7 is in parallel to the disc surface 12. More specifically, a line connecting the support point P of the support 7 and the center Q of the permanent magnet 6 is in parallel to the disc surface 12. In addition, the driver 9 is arranged such that the direction of the drive force by the mutual action of the magnetic field by the drive coil 10 and the permanent magnet 6 is in parallel to the disc surface 12 and coincides with the line described above.

By arranging the support 7 and the driver 9 in the manner described above, the driver 9 displaces the support 7 in parallel to the disc surface 12 so that only the force parallel to the disc surface 12 is applied to the scanning needle 3 and no force normal to the disc surface 12 is applied. Accordingly, the contact condition of the scanning needle 3 and the disc 11 does not change.

If the line connecting the support point P and the center Q of the permanent magnet 6 perfectly coincides with the drive force and is in parallel to the disc surface 12, no force normal to the disc surface 12 is applied to the scanning needle 3 and the needle pressure does not change. In practice, however, it is more or less difficult to arrange the support 7 such that the line connecting the support point P and the center Q of the permanent magnet 6 is perfectly in parallel to the disc surface 12. However, even if a certain error from the ideal position of the support 7 is included, a remarkable effect is attained to compare with the prior art pickup device in which no compensation is made.

The positioning error of the support 7 results in the rotation of the cantilever 1 around the support point P of the support 7 in the direction normal to the disc surface 12.

Thus, by eliminating the affect by the rotation of the cantilever 1, the change in the needle pressure of the scanning needle 3 is further suppressed. In accordance with the present invention, a bias current is supplied from a D.C. power supply to the drive coil 10 in addition to the jitter compensation drive current via a compensation current supplying apparatus to create a force F' for attracting the permanent magnet 6 by the mutual action of the magnetic field generated thereby and the permanent magnet 6. Since the driver 9 is arranged such that the force created by the mutual action of the magnetic field by the drive coil 10 and the permanent magnet 6 is in parallel to the disc surface 12, the attraction force F' is also in parallel to the disc surface 12.

Figure 4:
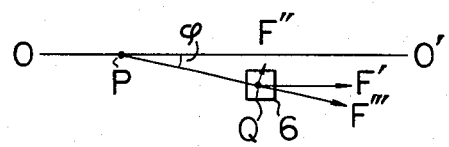
FIG. 4 shows a chart for explaining the operation of the pickup device of FIG. 3.

The action of the attraction force F' is explained with reference to a vector diagram of FIG. 4, in which the like elements to those shown in FIG. 3 are designated by the like numerals. A line 00' passes through the support point P of the support 7 (FIG. 3) and extends in parallel to the disc surface 12 (FIG. 3). Let us assume that the support 7 (FIG. 3) is arranged such that the permanent magnet 6 is below the line 00'. When the drive force is applied, the support rotates around the support point P as described above, but when the attraction force F' consisting of a component F''' which is parallel to a line PQ and a component F'' which is normal thereto is applied to the permanent magnet 6, the normal component F'' acts to attract the permanent magnet 6 toward the line 00'. As a result, the line PQ coincides with the line 00'. In this manner, even if the support includes a certain positioning error, it can be compensated.

As described hereinabove, in accordance with the present invention, the support is arrranged such that the line connecting the support point of the support and the center of the permanent magnet mounted on the support is in parallel to the disc surface and the driver is arranged such that the drive force created by the permanent magnet is in parallel to the disc surface, and the constant D.C. current for attracting the permanent magnet is supplied to the driver. Accordingly, the jitter can be eliminated without varying the needle pressure of the scanning needle. Thus, the present invention provides an inexpensive pickup device having an excellent performance not attainable by the prior art device.

We claim:

1. A pickup device comprising:
   a scanning needle having a signal detecting electrode;
   a cantilever having said scanning needle mounted at one end thereof and a permanent magnet mounted at the other end thereof;
   a support for resiliently supporting said cantilever;
   a jitter compensation drive coil for generating a magnetic field to be acted on said permanent magnet;

a current flowing in said drive coil being varied to drive said scanning needle in the direction of a record track of a disc to compensate for jitter;

said support and said permanent magnet being arranged relative to each other such that a line connecting a support point of said support and a center of said permanent magnet is in parallel to a surface of said disc.

2. A pickup device comprising:

a scanning needle having a signal detecting electrode;

a cantilever having said scanning needle mounted at one end thereof and a permanent magnet mounted at the other end thereof;

a support for resiliently supporting said cantilever;

a jitter compensation drive coil for generating a magnetic field to be acted on said permanent magnet;

a current flowing in said drive coil being varied to drive said scanning needle in the direction of a record track of a disc to compensate for jitter; and means for supplying a constant D.C. current to said drive coil, said support and said permanent magnet being arranged relative to each other such that a line connecting a support point of said support and a center of said permanent magnet is parallel to a surface of said disc.

3. A pickup device comprising:

a scanning needle having a signal detecting electrode;

a cantilever having said scanning needle mounted at one end thereof and a permanent magnet mounted at the other end thereof;

a support for resiliently supporting said cantilever;

jitter compensation means including a jitter compensation drive coil for generating a magnetic field for acting on said permanent magnet when supplied with a drive current, and means for supplying a varying current to said drive coil to drive said scanning needle in the direction of a record track of said disc to compensate for jitter; and means for reducing a variation of pressure of said scanning needle with respect to said disc in a direction normal to a surface of said disc when the jitter compensation is applied to said scanning needle, said pressure variation reducing means including arranging said support and permanent magnet relative to each other such that a line connecting a support point of said support and a center of said permanent magnet is in parallel to the surface of said disc.

4. A pickup device according to claim 3, wherein said pressure variation reducing means further includes means for supplying a constant D.C. current to said drive coil.

5. A pickup device according to claim 4, wherein said drive coil is responsive to said constant D.C. current for generating a magnetic field having an attractive force acting on said permanent magnet in a direction parallel to the surface of said disc.

* * * * *